United States Patent
Bonicatto et al.

(10) Patent No.: US 9,667,315 B2
(45) Date of Patent: May 30, 2017

(54) POWER DISTRIBUTION LINE COMMUNICATIONS WITH COMPENSATION FOR POST MODULATION

(75) Inventors: Damian Bonicatto, Pequot Lakes, MN (US); Stuart L. Haug, Hackensack, MN (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 243 days.

(21) Appl. No.: 13/603,596

(22) Filed: Sep. 5, 2012

(65) Prior Publication Data

US 2014/0064387 A1 Mar. 6, 2014

(51) Int. Cl.
*G05B 11/01* (2006.01)
*H04B 3/54* (2006.01)

(52) U.S. Cl.
CPC ....... *H04B 3/54* (2013.01); *H04B 2203/5408* (2013.01)

(58) Field of Classification Search
CPC ........... H04L 5/0007; H04L 1/0026; H04L 25/03821; H04L 5/0094; H04B 3/54; H04B 3/542; H04B 2203/5433; H04B 17/0042; H04B 17/005; H04B 17/0055; H04B 17/057; H04B 15/00; H04B 1/1027; H04B 2001/1045
USPC ...................................................... 340/12.32
See application file for complete search history.

(56) References Cited

U.S. PATENT DOCUMENTS

| | | | |
|---|---|---|---|
| 5,285,474 A * | 2/1994 | Chow et al. | 375/231 |
| 5,581,229 A | 12/1996 | Hunt | |
| 6,154,488 A | 11/2000 | Hunt | |
| 6,177,884 B1 | 1/2001 | Hunt et al. | |
| 6,998,963 B2 | 2/2006 | Flen et al. | |
| 7,042,957 B1 * | 5/2006 | Zirwas | H04L 5/0048 375/260 |
| 7,102,490 B2 | 9/2006 | Flen et al. | |
| 7,145,438 B2 | 12/2006 | Flen et al. | |
| 7,180,412 B2 | 2/2007 | Bonicatto et al. | |
| 7,184,861 B2 | 2/2007 | Petite | |
| 7,209,840 B2 | 4/2007 | Petite et al. | |
| 7,224,740 B2 | 5/2007 | Hunt | |
| 7,236,765 B2 | 6/2007 | Bonicatto et al. | |
| 7,346,463 B2 | 3/2008 | Petite et al. | |
| 7,366,088 B2 * | 4/2008 | Bolinth et al. | 370/203 |
| 7,432,824 B2 | 10/2008 | Flen et al. | |

(Continued)

FOREIGN PATENT DOCUMENTS

KR WO 2012036439 A2 * 3/2012

*Primary Examiner* — Ryan Sherwin
(74) *Attorney, Agent, or Firm* — Crawford Maunu PLLC

(57) ABSTRACT

A system for communicating data over power utility lines includes a plurality of endpoint devices. The endpoint devices can have modulation circuits configured and arranged to modulate data using multiple-orthogonal frequency sub-channels. The endpoint devices can also have a power line interface circuit configured and arranged to transmit the modulated data over a power utility line. A detection module can be configured and arranged to detect undesirable post modulation of a communication from one of the plurality of endpoint devices and to generate a signal responsive to the detected post modulation. The endpoint devices can then set a spacing between the multiple orthogonal frequency sub-channels in response to the signal responsive to the detected post modulation.

20 Claims, 5 Drawing Sheets

(56) References Cited

U.S. PATENT DOCUMENTS

| | | |
|---|---|---|
| 7,443,313 B2 | 10/2008 | Davis et al. |
| 7,468,661 B2 | 12/2008 | Petite et al. |
| 7,706,320 B2 | 4/2010 | Davis et al. |
| 7,738,999 B2 | 6/2010 | Petite |
| 7,742,393 B2 | 6/2010 | Bonicatto et al. |
| 7,774,530 B2 | 8/2010 | Haug et al. |
| 7,791,468 B2 | 9/2010 | Bonicatto et al. |
| 7,877,218 B2 | 1/2011 | Bonicatto et al. |
| 7,978,059 B2 | 7/2011 | Petite et al. |
| 8,144,816 B2 | 3/2012 | Bonicatto et al. |
| 8,144,820 B2 | 3/2012 | Bonicatto |
| 8,170,081 B2* | 5/2012 | Forenza et al. ............... 375/141 |
| 8,194,789 B2 | 6/2012 | Wolter et al. |
| 8,213,398 B2* | 7/2012 | Geile et al. ................... 370/343 |
| 8,238,263 B2 | 8/2012 | Kohout et al. |
| 8,855,279 B2* | 10/2014 | Forbes et al. ............ 379/106.03 |
| 2002/0141523 A1 | 10/2002 | Litwin, Jr. et al. |
| 2003/0115391 A1 | 6/2003 | Ajanovic et al. |
| 2004/0160990 A1 | 8/2004 | Logvinov et al. |
| 2005/0025040 A1* | 2/2005 | Tang et al. .................... 370/208 |
| 2005/0152468 A1* | 7/2005 | Lozhkin ........................ 375/260 |
| 2007/0002772 A1* | 1/2007 | Berkman et al. ............. 370/257 |
| 2007/0222579 A1* | 9/2007 | Berkman ...................... 340/538 |
| 2008/0304595 A1 | 12/2008 | Haug et al. |
| 2008/0310457 A1* | 12/2008 | Yamashita et al. ........... 370/491 |
| 2009/0161774 A1 | 6/2009 | Liu et al. |
| 2009/0299532 A1* | 12/2009 | Zyren ........................... 700/276 |
| 2009/0316766 A1* | 12/2009 | Korobkov et al. ............ 375/227 |
| 2010/0021166 A1 | 1/2010 | Way |
| 2010/0164615 A1* | 7/2010 | Bonicatto ...................... 329/304 |
| 2010/0238815 A1* | 9/2010 | Kohout et al. ................. 370/252 |
| 2010/0316140 A1 | 12/2010 | Razazian et al. |
| 2011/0121952 A1 | 5/2011 | Bonicatto et al. |
| 2011/0142108 A1 | 6/2011 | Agee et al. |
| 2011/0176598 A1 | 7/2011 | Kohout et al. |
| 2011/0218686 A1 | 9/2011 | McHann, Jr. et al. |
| 2011/0249678 A1 | 10/2011 | Bonicatto et al. |
| 2012/0057592 A1 | 3/2012 | Zeppetelle et al. |
| 2012/0076212 A1 | 3/2012 | Zeppetelle et al. |
| 2012/0076228 A1 | 3/2012 | Wu et al. |
| 2012/0084559 A1 | 4/2012 | Bonicatto |
| 2012/0106664 A1 | 5/2012 | Bonicatto et al. |
| 2013/0142231 A1* | 6/2013 | Schwager et al. ............ 375/222 |
| 2013/0163681 A1 | 6/2013 | Wolter et al. |
| 2013/0170464 A1* | 7/2013 | Hwang et al. ................. 370/329 |

* cited by examiner

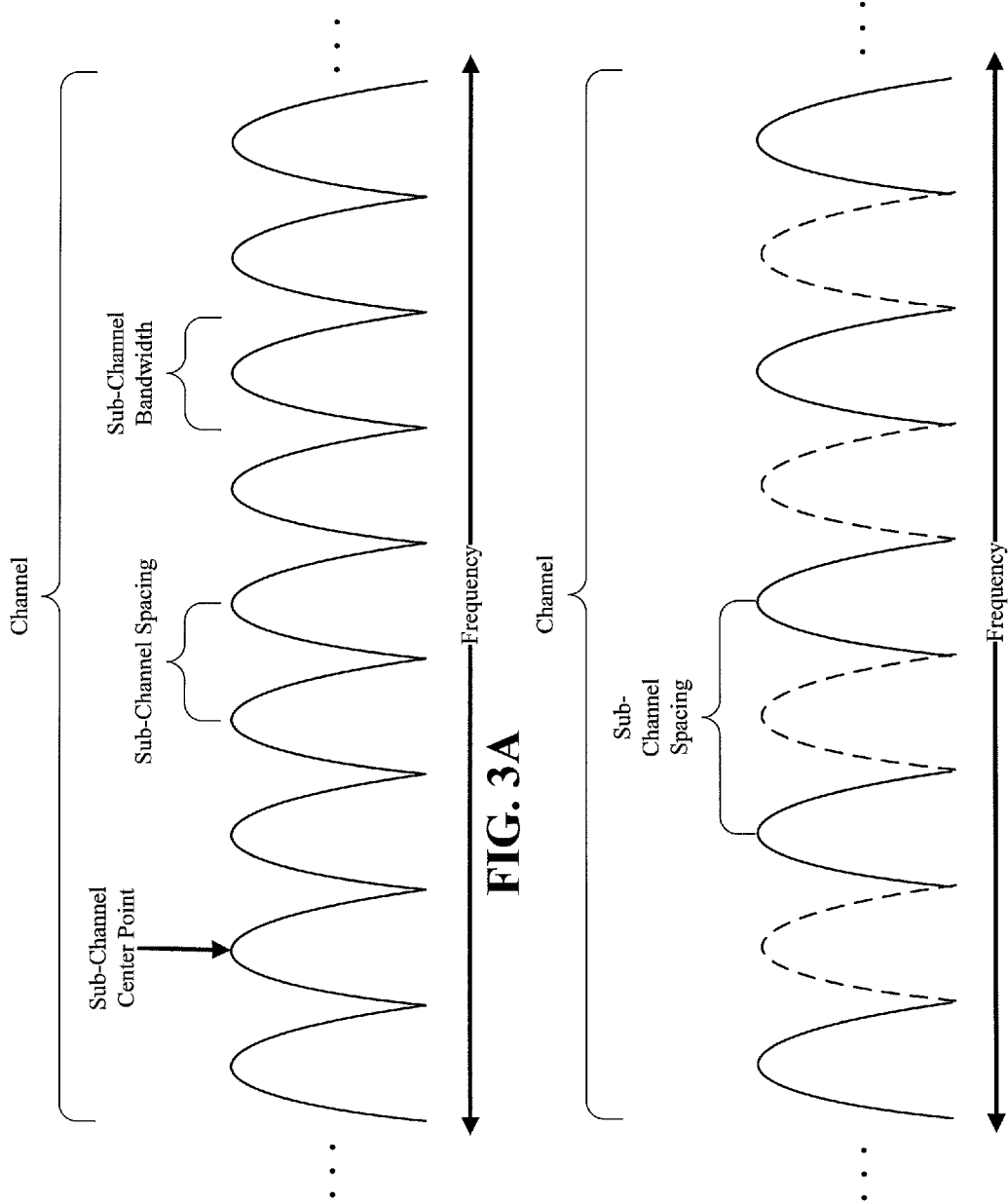

POWER DISTRIBUTION LINE COMMUNICATIONS WITH COMPENSATION FOR POST MODULATION

An electrical grid delivers electrical power to consumers using an interconnected power network. Power stations/plants produce electricity from a number of different power sources including, but not limited to, combustible fuels, nuclear fission, water, solar energy and wind. Transmission lines deliver the electricity from the power stations to consumer's premises, which include residential and commercial buildings. Long distance transmission can be carried out using high voltage alternating current (AC) (e.g., on order of hundreds of kilovolts), which is useful for reducing energy loss. Substations include transformers for reducing the voltage (e.g., under 10,000 volts) for subsequent delivery to a local area. The voltage can be further reduced (e.g., down to 120-280 volts) using a local transformer, sometimes referred to as a transformer drum/can for its traditional drum-like shape or as a pad mount, for delivery to a consumer's premises.

Service providers are dependent on proper operation of their respective networks to deliver services to the customers. Often, it can be desirable or necessary to ascertain information regarding the services that are provided. For example, the service provider may want access to daily usage reports to efficiently bill their customers for the resources that are consumed or otherwise utilized by the customers. Therefore, it is important for data specifying resource utilization and other information to be reliably transmitted and/or received at specified intervals.

In power line communication (PLC) networks, endpoints in the network (e.g., meters, load control switches, remote service switches, and other endpoints) can provide updated information (e.g., power consumption information and/or endpoint operating status information) by transmitting data over power distribution lines that also carry alternating current. However, effectively communicating such data can be challenging to accomplish, particularly in a timely manner. Moreover, capabilities of endpoint and other communication devices can be limited, as can aspects of transmission protocols amenable to implementation with PLC data transfer.

Aspects of the present disclosure are directed toward methods, devices or systems for dynamically adjusting transmission protocols in response to detected interference.

SUMMARY

The present disclosure is directed to systems and methods for use with distributed communications systems and methods in the context of an electrical grid for power distribution. These and other aspects of the present disclosure are exemplified in a number of illustrated implementations and applications, some of which are shown in the figures and characterized in the claims section that follows.

Certain embodiments are directed toward a method for communicating data from a plurality of endpoint devices to a collector device over a power distribution line. A channel, containing orthogonal sub-channels (or tones), is assigned to an endpoint device of the plurality of endpoint devices. A processing circuit can detect the loss of orthogonality between the sub-channels of the plurality of endpoint devices and for a communication from the endpoint device of the plurality of endpoint devices. For the endpoint device of the plurality of endpoint devices and in response to the detection, a spacing between the multiple orthogonal frequency sub-channels can be selected for future communication.

Various embodiments are directed to a system for communicating data over power utility lines, wherein the system includes a plurality of endpoint devices. The endpoint devices can have modulation circuits configured and arranged to modulate data using multiple orthogonal frequency sub-channels and to modify spacing between the multiple orthogonal frequency sub-channels in response to data received at an input. The endpoint devices can also have a power line interface circuit configured and arranged to transmit the modulated data over a power utility line. A detection module can be configured and arranged to detect post modulation of a communication from one of the plurality of endpoint devices and to provide a signal responsive to detected post modulation to the input.

Various embodiments are directed to a method that includes communicating data from a plurality of endpoint devices to a collector device over a power utility line, the communication of data from each of the plurality of endpoint devices being carried out by modulating data using multiple orthogonal frequency sub-channels. Undesirable post modulation of a communication from one of the plurality of endpoint devices is detected. For the one of the plurality of endpoint devices and in response to the detection, spacing between the multiple orthogonal frequency sub-channels for future communication is detected.

Embodiments are directed toward a system for communicating data over power utility lines which includes a plurality of endpoint devices. The endpoint devices can have modulation circuits configured and arranged to modulate data using multiple-orthogonal frequency sub-channels. The endpoint devices can also have a power line interface circuit configured and arranged to transmit the modulated data over a power utility line. A detection module can be configured and arranged to detect undesirable post modulation of a communication from one of the plurality of endpoint devices and to generate a signal responsive to the detected post modulation. The endpoint devices can then set a spacing between the multiple orthogonal frequency sub-channels in response to the signal responsive to the detected post modulation.

Particular embodiments are also directed toward an apparatus that includes communication circuitry that is configured and arranged to communicate data from a plurality of endpoint devices to a collector device over a power distribution line. The apparatus also includes detection circuitry that is configured and arranged to detect a loss of orthogonality between sub-channels for a communication from an endpoint device of the plurality of endpoint devices. Signal-processing circuitry can also be configured and arranged to select, for the endpoint device of the plurality of endpoint devices and in response to the detection, a spacing between the multiple orthogonal frequency sub-channels for ongoing communication.

The above summary is not intended to describe each illustrated embodiment or every implementation of the present disclosure. The figures and detailed description that follow, including that described in the appended claims, more particularly describe some of these embodiments.

BRIEF DESCRIPTION OF FIGURES

Various example embodiments may be more completely understood in consideration of the following detailed description in connection with the accompanying drawings, in which:

FIGS. 3A-3C depict different sub-channel spacing, consistent with embodiments of the present disclosure.

Figure 1:
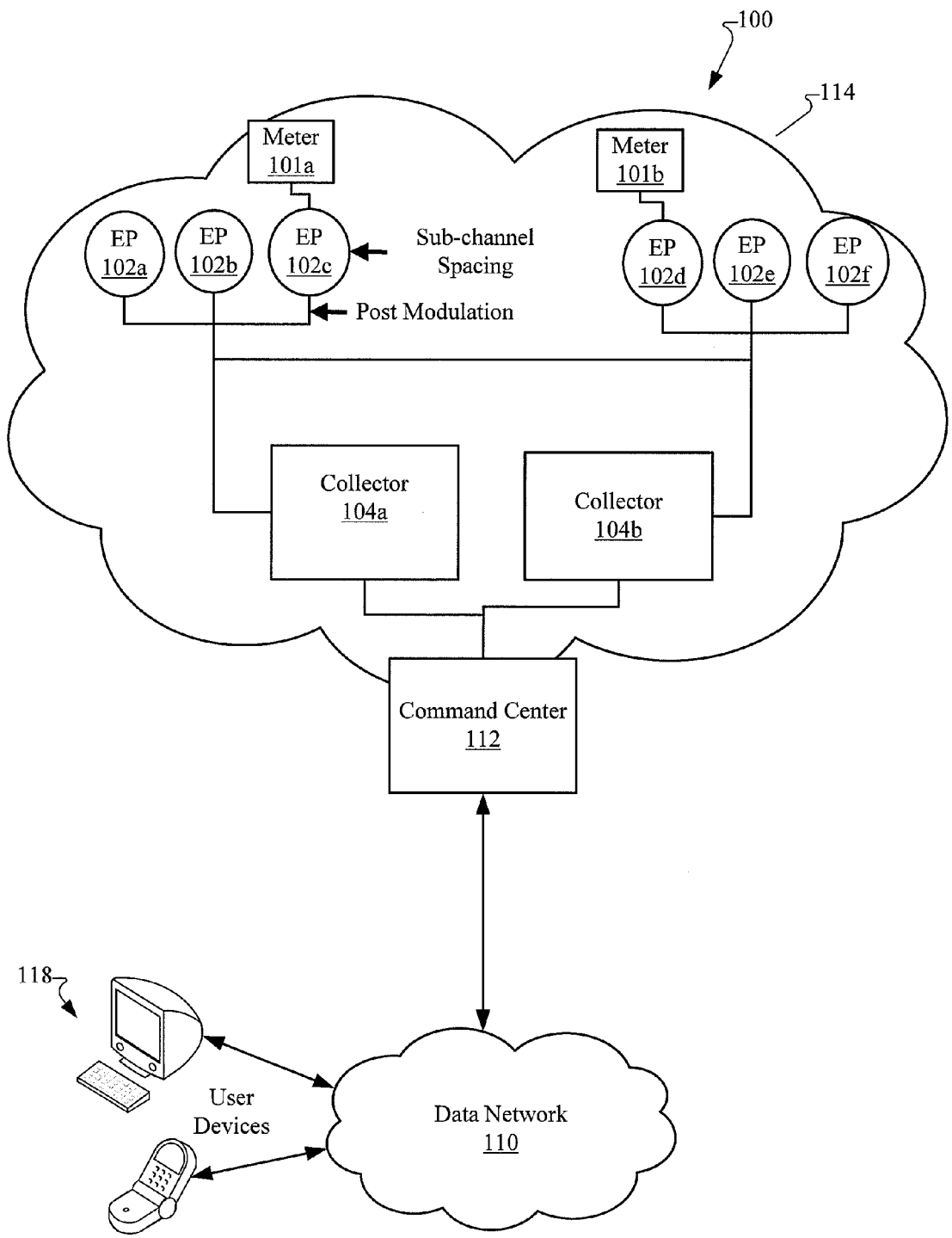
FIG. 1 is a block diagram of an example power distribution line communication (PLC) network environment in which endpoints communicate data with collector units, consistent with embodiments of the present disclosure.

While the disclosure is amenable to various modifications and alternative forms, examples thereof have been shown by way of example in the drawings and will be described in detail. It should be understood, however, that the intention is not to limit the disclosure to the particular embodiments shown and/or described. On the contrary, the intention is to cover all modifications, equivalents, and alternatives falling within the spirit and scope of the disclosure.

DETAILED DESCRIPTION

Aspects of the present disclosure are believed to be applicable to a variety of different types of devices, systems and arrangements, including those that may be implemented for dynamic adjustment of transmission protocols in a power distribution system. While the present disclosure is not necessarily limited to such applications, various aspects of the invention may be appreciated through a discussion of various examples using this context.

Aspects of the present disclosure are directed toward a system with distributed endpoints that communicate with a collector device over power distribution lines. Particular embodiments are directed toward a modulation/encoding solution that accounts for undesirable post modulation of communications from endpoint devices by setting the spacing between communication sub-channels (or tones) accordingly. Although not limited thereto, certain aspects of the present disclosure are premised upon the surprising discovery that this undesirable post modulation can be particularly problematic in a small percentage of locations. More particular aspects relate to the surprising discoveries as to the source of this undesirable post modulation and to various mechanisms for detecting the undesirable post modulation.

Consistent with various embodiments, a plurality of endpoints can be located at homes, buildings and other locations to which electrical power is distributed. The endpoints communicate with a common collector device using shared power distribution lines (and there can be multiple sets of endpoints and collector devices). This type of communication over power distribution lines is a difficult proposition due to, among other problems, the many sources of noise and interference, the presence of alternating current and associated harmonics, the presence of transformers and other impedance varying components, and the variations on impedance seen at different connection points along the power grid. Accordingly, the endpoints can use complex transmission protocols and modulation techniques to facilitate the communication of significant amounts of data between the endpoints and the collector device. A possible (non-limiting) protocol is multi-tone frequency shift keying (MTFSK). Aspects of the present disclosure recognize that individual endpoint devices can be designed and configured to respond to undesirable post modulation by adjusting their respective modulation/coding.

In certain embodiments, the endpoints are configured to transmit on a channel that is defined to include multiple sub-channels. To avoid inter-channel interference (ICI) between sub-channels, the sub-carrier frequencies are chosen so that the sub-carriers are orthogonal to each other, meaning that cross-talk between the sub-channels is eliminated and the need for inter-carrier guard bands can be mitigated or eliminated. In various implementations, the endpoints can use a local oscillator to generate the carrier frequencies for the sub-channels. The data can then be spread across several sub-channels, with each sub-channel providing additional bandwidth.

It has been discovered that undesirable post modulation can occur to data transmitted over power distribution lines. In particular examples, this post modulation can include amplitude modulation that is believed to be caused by significant and dynamic changes in the impedance of the power distribution lines. This type of undesirable post modulation was discovered to cause a spreading of energy for signals transmitted using the sub-channels and thereby resulted in ICI between sub-channels. Somewhat surprisingly, the spreading and resulting ICI was significant enough (in certain limited instances) to cause a noticeable degradation in signal quality and to bit error rates thereof. In particularly, the undesirable post modulation of the signal amplitude has been found to create significant interference and/or harmonics in nearby sub-channels. Although not necessarily limited thereto, various embodiments are directed toward detection of this surprising degradation and to providing compensation in response to the detection. In some instances, one or more likely causes of the post modulation can be detected (e.g., changes to effective impedance, changes to the amplitude of the power distribution line voltages and/or enabling of large power-draw at the customer premises). In other instances, the effects of the post modulation can be detected (e.g., temporary changes to the bit error rate and/or the noise floor). Once undesirable post modulation is detected, the spacing between the sub-channels can be increased.

Aspects of the present disclosure are directed toward setting spacing between sub-channels in response to detecting undesirable post modulation of data that is transmitted using the sub-channels. It has been recognized that the adverse effects of the post modulation (e.g., ICI) generally reduces as a function of the spacing between the sub-channels. Particular embodiments are directed toward increasing spacing between sub-channels by using less than all of the available sub-channels. For instance, the sub-channels that are assigned to a particular channel can have a spacing that maintains orthogonality in the absence of post modulation. A sub-channel between each channel can be removed from the available channels and thereby increase the spacing between the remaining channels. For particularly problematic instances, more than one channel can be removed from between each remaining channel. Particular embodiments of the present disclosure allow for dynamic adjustments to the spacing between channels. This can be particularly useful for instances when the extent (or existence) of post modulation is not known before, or at the time of, installation of an endpoint device.

Turning now to the figures, FIG. 1 is a block diagram of an example power distribution line communication (PLC) network environment 100 in which endpoints 102 communicate data with collector units, consistent with embodiments of the present disclosure. The network environment 100 includes a service network 114 in which a plurality of endpoint devices 102a-102f are coupled (e.g., communicatively coupled) to collector units 104a, 104b. Consistent with embodiments of the present disclosure, the endpoints 102 can provide data from utility meters 101a-101b, although other sources of data are equally possible. In some instances, data can be provided from power meters, gas meters and/or water meters, which are respectively installed in gas and water distribution networks. For ease of description the embodiments and examples are sometimes described with reference to endpoints 102 as providing utility data (e.g., power) metering over a power distribution network. However, the embodiments are not so limited and it is understood that other data can also be communicated by endpoint devices.

Data communication over utility distribution networks is difficult due to the environment of the transmission mediums and the sheer number of endpoint devices, which contribute to a host of issues including synchronization, communication bandwidth and cost concerns. For example, data transmitters for distribution lines must be able to handle high voltages inherently present on the power lines. The power distribution network 100 shown in FIG. 1 may also exhibit dynamic impedance changes which may make communication difficult due to coupling capacitor degradation, addition and removal of other endpoint devices 102, reconfiguration of the network to balance power loads, reconfiguration of frequency bands assigned to the transmitters, environmental factors, etc. As a result of changes to signal conditions on the power distribution lines, endpoint transmitters may need to adjust the gain for signals transmitted to collectors 104. In one or more embodiments the endpoint devices 102 and/or collectors 104 may also be configured to detect undesirable post modulation and to adjust frequency-based settings/spacing for endpoint transmitters.

The endpoints 102 can be implemented to monitor and report various operating characteristics of the service network 114. For example, in a power distribution network, meters 101a-101b can monitor characteristics related to power usage in the network. Example characteristics related to power usage in the network include average or total power consumption, power surges, power drops and load changes, among other characteristics. In gas and water distribution networks, meters can measure similar characteristics that are related to gas and water usage (e.g., total flow and pressure).

When the endpoints 102 are implemented as power meters in a power distribution network, the power meters transmit reporting data that specify updated meter information that can include measures of total power consumption, power consumption over a specified period of time, peak power consumption, instantaneous voltage, peak voltage, minimum voltage and other measures related to power consumption and power management (e.g., load information). Each of the power meters can also transmit other data, such as status data (e.g., operating in a normal operating mode, emergency power mode, or another state such as a recovery state following a power outage).

In FIG. 1, endpoints 102a-102c and 102d-102f transmit data over power distribution lines to collector units 104a, 104b, respectively. The collector units 104 can include circuitry (e.g., including one or more data processors and/or digital signal processors (DSPs)) that is configured and arranged to communicate with the endpoints over power distribution lines. The collector units 104 can also include circuitry for interfacing with a command center 112 at a local utility office or other location. The interface to the command center 112 can be implemented using a variety of different communication networks including, but not limited to, a wide-area network (WAN) using Ethernet.

According to certain embodiments of the present disclosure, the collectors may be installed in power stations, power substations, transformers, etc. to control bidirectional communication between the command center 112 (e.g., located at a utility office) and endpoints (e.g., located at metering locations for customer sites). This messaging to the endpoints can be sent to an individual endpoint, or broadcast simultaneously to a group of endpoints or even sent to all endpoints connected to the collectors 104. Consistent with certain embodiments, the collectors 104 are built according to an industrial-grade computer specification in order to withstand the harsh environment of a substation.

In some embodiments, a collector may take action based on the data received from the endpoints and transmit data received from the endpoints to the command center 112. For example, in a PLC network, the command center 112 can receive data indicating that power usage is significantly higher in a particular portion of a power network than in other portions of the power network. Based on this data, the command center 112 can allocate additional resources to that particular portion of the network (i.e., load balance) or provide data specifying that there is increased power usage in the particular portion of the power network.

Consistent with certain embodiments, the command center 112 provides an interface that allows user devices 118 access to data received by the command center 112 via data network 110. For example, the user devices 118 might be owned by operators of a utility-provider, maintenance personnel and/or customers of the utility provider. For example, data identifying the increased power usage described above can be provided to a user device 118, which can, in turn, determine an appropriate action regarding the increased usage. Additionally, data identifying a time-of-use measure and/or a peak demand measure can also be provided to the user device 118. Similarly, if there has been a power outage, the command center 112 can provide data to user devices 118 that are accessible by customers to provide information regarding the existence of the outage and potentially provide information estimating the duration of the outage.

The data network 110 can be a wide area network (WAN), local area network (LAN), the Internet, or other communications network. The data network 110 can be implemented as a wired or wireless network. Wired networks can include any media-constrained networks including, but not limited to, networks implemented using metallic wire conductors, fiber optic materials, or waveguides. Wireless networks include all free-space propagation networks including, but not limited to, networks implemented using radio wave and free-space optical networks.

Endpoint transmitters may be configured to transmit data to collectors 104 using a number of different data modulation techniques, including frequency shift keying (FSK), phase shift keying (PSK, e.g., Quadrature PSK or 8PSK), multiple tone frequency shift keying (MTFSK, e.g., 2 of 9, or 2 of 46 MTFSK), Quadrature Amplitude Modulation (QAM, e.g., 16 or 256 QAM), etc. A particular data modulation technique that is discussed herein is multi-tone frequency shift keying (MTFSK). Encoded data symbols from a particular endpoint may be transmitted over one of thousands of communications channels in a PLC system. Communication channels may be allocated from various portions of spectrum over which data are transmitted. Each channel can be further allocated into sub-channels. The center frequency and bandwidth of each communications channel can depend on the communications system in which they are implemented. In some implementations, multiple communication channels may use time slots to operate in one or more shared frequency bands. For example, each endpoint can be assigned a particular channel according to an orthogonal frequency division multiple access (OFDMA) or another channel allocation technique. Channel assignments for the endpoints 102a-102c, 102d-102f that communicate with particular collectors 104a, 104b can be stored, for example, in a database that is accessible to the command center 112 and/or the collectors 104a, 104b.

Consistent with embodiments of the present disclosure, each collector 104 can be configured to be in communication with thousands of endpoints 102, and thousands of collectors 104 can be in connection with the command center 112. For example, a single collector can be configured to communicate with over 100,000 endpoint devices and a command center can be configured to communicate with over 1,000 collectors. Thus, there can be millions of total endpoints and many thousands of endpoints can communicate to the same collector over a shared power distribution line. Accordingly, embodiments of the present disclosure are directed toward communication protocols that are designed for use in this demanding context.

Particular embodiments relate to the surprising discovery that certain locations/customer premises can exhibit significant levels of undesirable post modulation of transmissions from endpoints 102. This undesirable post modulation was found, in a limited number of instances, to result in ICI between sub-channels used by the endpoints 102. Without being limited by theory, experimental tests suggest that this undesirable post modulation can be caused by local impedance changes seen by a particular endpoint 102. Moreover, further experiments suggest a correlation between local impedance changes and changes in the load at the location.

In specific embodiments, the undesirable post modulation was shown to be an amplitude modulation, which can be caused by changes in impedance. For certain communication protocols, such as multi-tone frequency shift keying (MTFSK) using orthogonal sub-channels, amplitude modulation can cause energy spreading (e.g., increasing the effective frequency bandwidth) for the signals transmitted using the sub-channels. This can cause energy from a particular sub-channel to appear in other (adjacent) sub-channels (e.g., due to the sinc(x) response created from the less than orthogonal timing). This can lead to reduced signal to noise ratio and even symbol errors. Increasing the gain of endpoints transmitters may not solve this problem because this can cause additional energy to appear in the other sub-channels (e.g., increasing the signal strength can increase the amount of ICI). Accordingly, embodiments of the present disclosure are directed toward detecting the presence of undesirable post modulation and to increasing the spacing between sub-channels (e.g., thereby reducing the ICI relative to the sinc(x) response created from the less than orthogonal timing).

Consistent with certain embodiments, the collectors 104a can transmit a parameter to an endpoint 102c to indicate that the endpoint should use even sub-channels 0, 2, 4, 6, . . . , while odd sub-channels 1, 3, 5, . . . are not used. This can be particularly useful for reducing the ICI caused by undesired post modulation. For example, assume subchannel 6 was one of the tones we are sending. Sub-channels 5 and 7 will receive some energy due to post modulation. While sub-channels 4 and 8 may also get some of the energy, it will generally be less energy than that received by sub-channels 5 and 7. More particular embodiments allow for a parameter to be provided that indicates the number of sub-channels to be unused/skipped. For instance, DSP code in the collector 102c can include a programmable slicer that allows changes in such parameters to be used. Other aspects of the present disclosure recognize a tradeoff of adding such spaces in terms of bandwidth and/or the number of sub-channels that are used for an endpoints channel.

Figure 2:
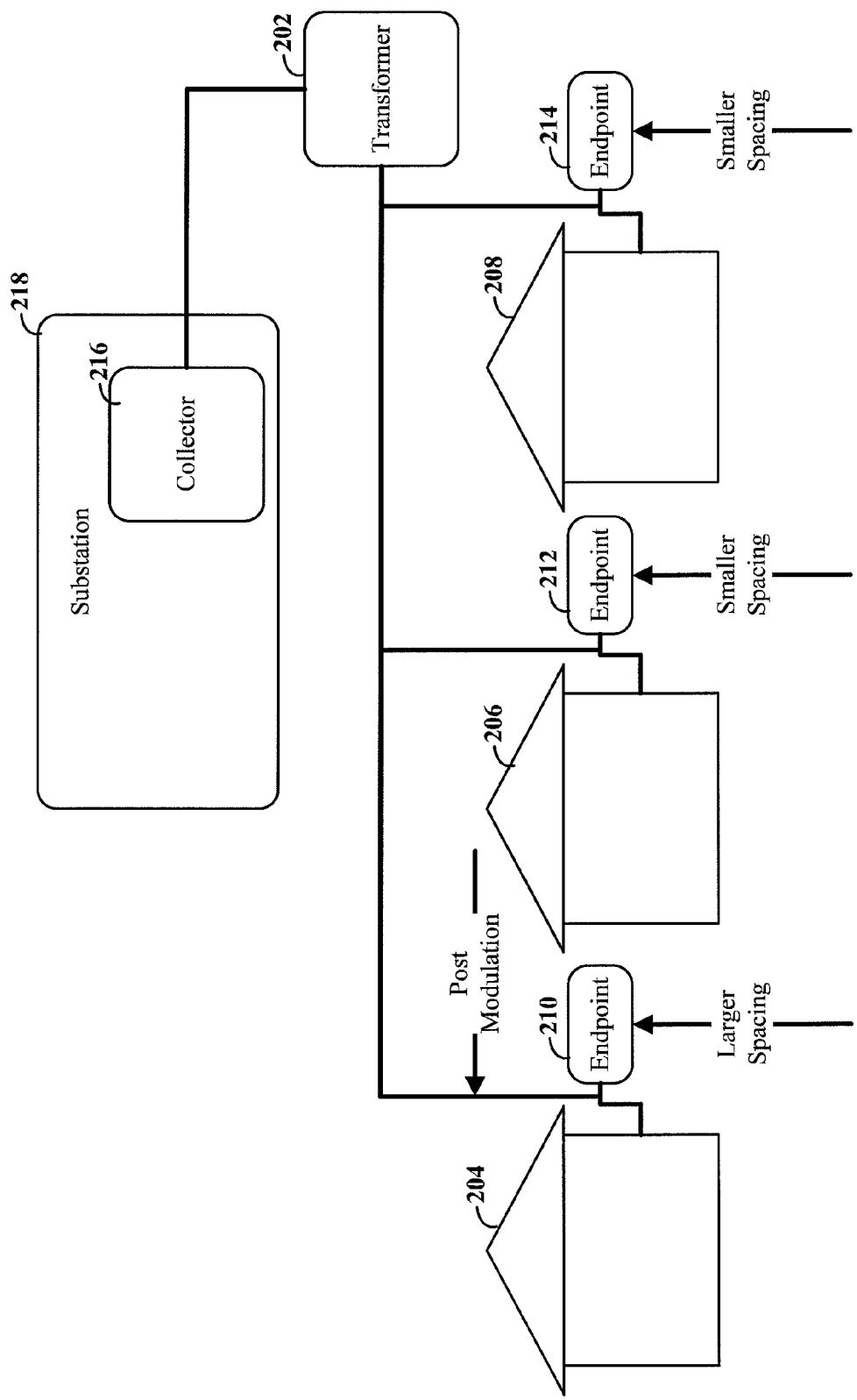
FIG. 2 depicts a system in which multiple endpoints are located at different locations, consistent with embodiments of the present disclosure.

FIG. 2 depicts a system in which multiple endpoints are located at different locations, consistent with embodiments of the present disclosure. Endpoints 210, 212 and 214 are each located at a different location (customer premises) 204, 206 and 208, respectively. Each endpoint 210, 212 and 214 can communicate with one or more collector devices 216. Complicating this communication is the potential for one or more transformers 202 to be located between the endpoints 210, 212 and 214 and the collector device 216. Moreover, many thousands of endpoints 210, 212 and 214 can communicate with a single collector device 216 and therefore the data bandwidth requirements can be significant even without large amounts of data being transmitted from each endpoint.

In certain embodiments, one or more collector devices 216 can be located at a power substation 218. From the substation, power distribution lines are routed to different locations, including various customer premises. In some instances, additional transformer(s) 202 can step down voltage of the provided power for local delivery to such premises.

Aspects of the present disclosure are directed toward endpoints 210, 212 and 214 being configured and arranged with processing circuitry that allows for different sub-channel spacing between the endpoints. In particular, the aforementioned undesirable post modulation is believed to be a relatively unusual problem. Setting the sub-channel spacing between the endpoints to a larger spacing for all endpoints 210, 212 and 214 would significantly reduce the available bandwidth. Accordingly, the endpoints 210, 212 and 214 can be configured to set the spacing between the endpoints to a larger spacing in response to detecting a potential problem, and leave the spacing smaller for other situations. For instance, endpoint 210 may detect undesirable post modulation and set the sub-channel spacing accordingly. At the same time endpoints 212 and 214 do not detect undesirable post modulation and the sub-channel spacing can be set/left at a smaller value.

Figure 3C:
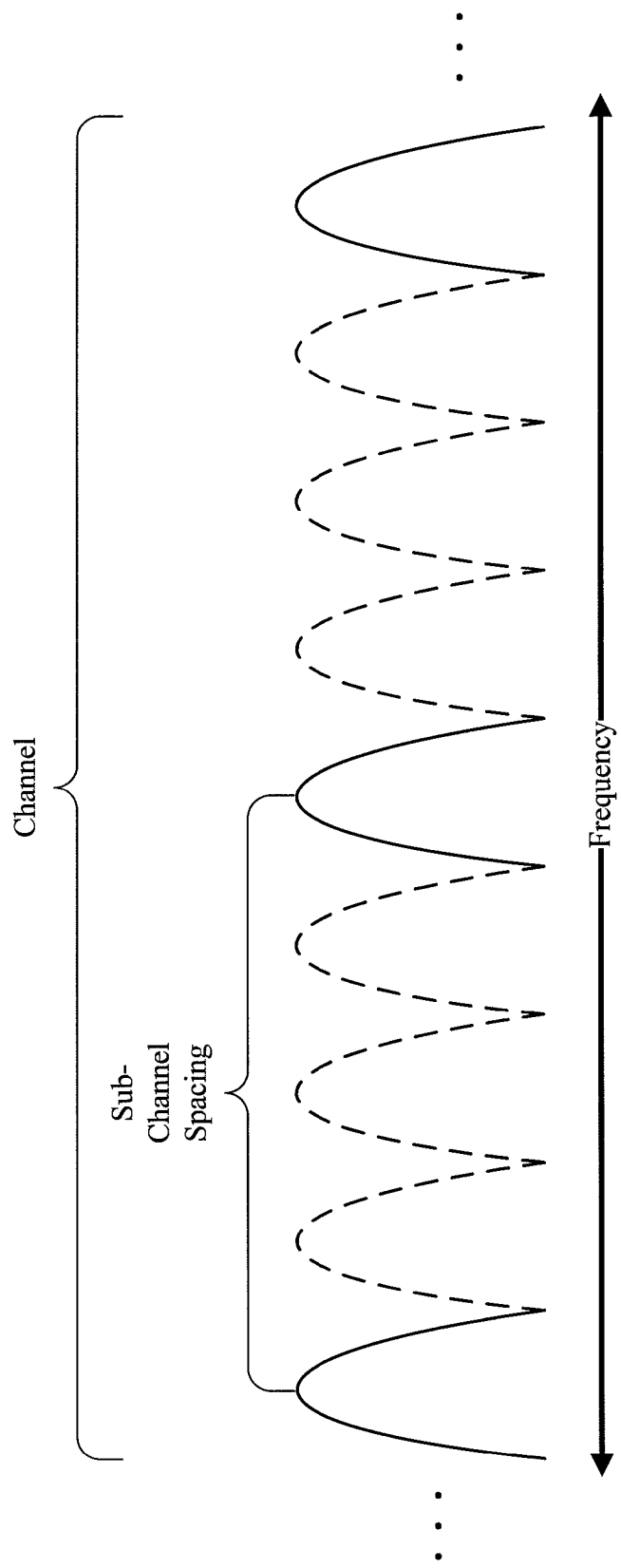

FIGS. 3A-3C depict different sub-channel spacing, consistent with embodiments of the present disclosure. FIG. 3A shows how an endpoint can be assigned a channel and use first sub-channel spacing. The sub-channel spacing is shown as being measured from the center point of the channel. The sub-channel bandwidths are arbitrarily shown and can even be overlapping due to the orthogonal nature of the signals transmitted on the sub-channels. FIG. 3B shows an endpoint with a second sub-channel spacing in which the spacing has increased relative to FIG. 3A. The sub-channels with the dotted line indicate sub-channels from FIG. 3A that are no longer used by the endpoint. In this manner, the effective spacing between the (used) sub-channels is increased (e.g., effectively doubled). This allows for a simple mechanism for adjusting a particular endpoint's sub-channel spacing within a system using a fixed channel and sub-channel assignment from a collector device. FIG. 3C shows an endpoint with a third sub-channel spacing in which the spacing has increased relative to both FIGS. 3A and 3B. As shown in FIG. 3C, the endpoint has set the sub-channel spacing to have three unused sub-channels between each used sub-channel. This provides even more sub-channel spacing than that depicted in FIG. 3B.

The particular level of sub-channel spacing can be set according to the detected/determined severity of the undesirable post channel modulation. In certain embodiments, this setting can be set in response to the level of a detected parameter. For instance, the level of the signal noise floor can determine whether one, two or more unused sub-channels are set between each used sub-channel. In various embodiments, this setting can be incrementally adjusted until a desired performance is reached. For example, the number of unused sub-channels can be increased until a desired bit-error rate is reached.

Certain embodiments can measure the noise floor by selecting one or more sub-channels to use as a signal channel and using measurements from the remaining channels to measure (approximate) the noise floor. For instance, the symbol modulation scheme could use a 2 of 12 modulation scheme (two tones used for the 12 available tones for the channel). The two strongest sub-channels could contain transmitted symbol(s) and represented corresponding signal strength(s). Energy in the remaining 10 channels could be measured to establish a noise floor. A signal-to-noise ratio (SNR) could then be determined. This analysis and measurement can be particularly useful for detecting the presence of undesirable post channel modulation because, for example, energy caused by ICI can be directly measured in the remaining 10 channels.

Figure 4:
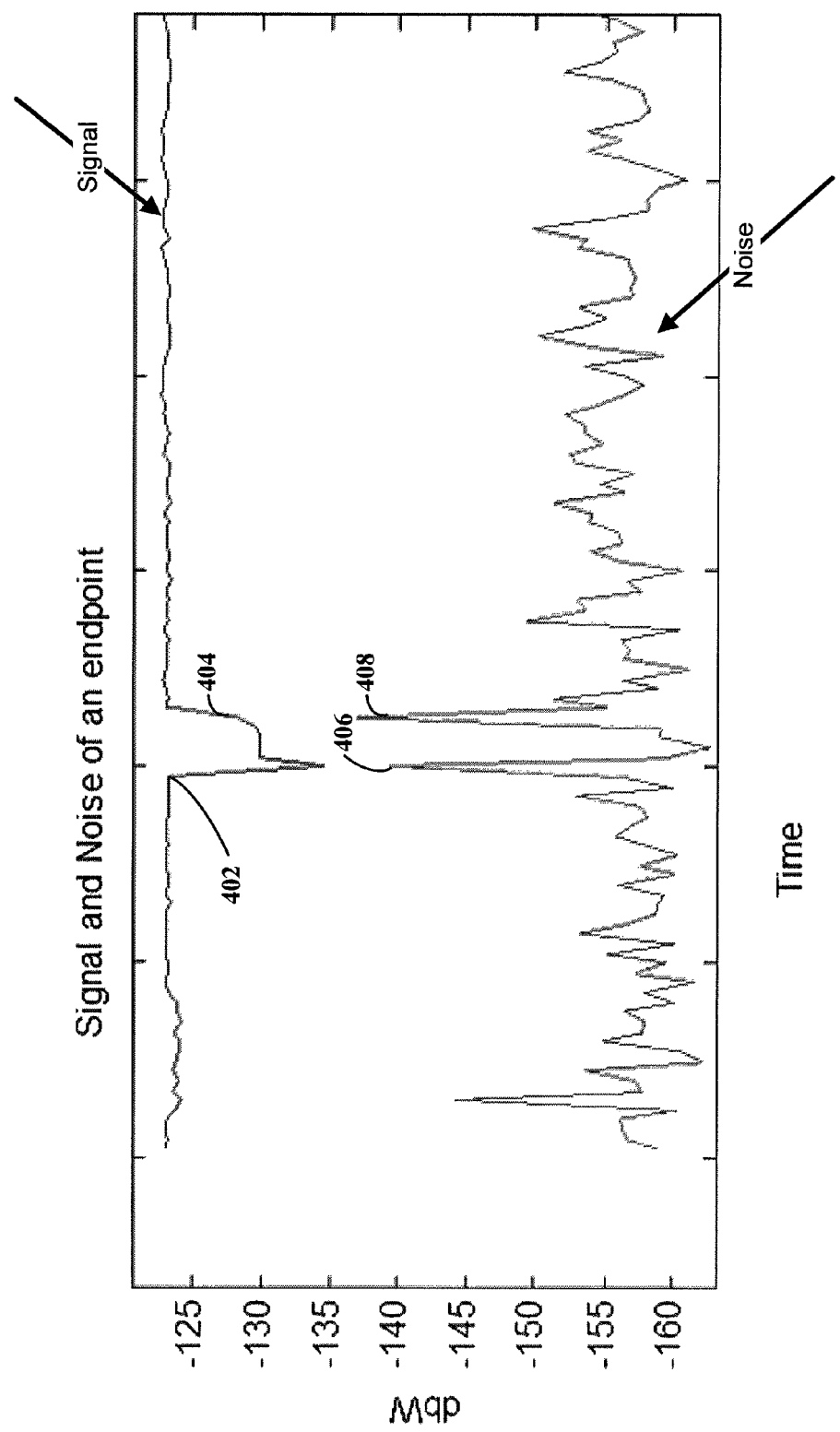
FIG. 4 depicts experimental results showing certain effects of undesirable post channel modulation, consistent with embodiments of the present disclosure.

FIG. 4 depicts experimental results showing certain effects of undesirable post channel modulation, consistent with embodiments of the present disclosure. The experimental results suggest that a particular type of undesirable post channel modulation can be correlated with readily identifiable signal and noise characteristics. In particular, the signal strength/amplitude decreases at time point 402. It maintains a relatively low signal strength/amplitude until time point 404. Experimental tests suggest that this pattern will repeat for this type of undesirable post channel modulation. Accordingly, this undesirable post channel modulation is noticeably different from other sources of communication problems, which may exhibit a high overall noise floor. Such other sources can often be compensated for by increasing the gain of the endpoint's transmitter. While increased gain can be used to combat undesirable post channel modulation such increases can be counterproductive or ineffective for undesirable post channel modulation because it can increase the ICI between sub-channels.

One effect of this type of sudden change in signal strength/amplitude is shown by corresponding increases in noise at time points 406 and 408. These increases in noise are believed to be a direct result of ICI and have been shown to result in transmission errors for extreme cases. Particular embodiments of the present disclosure are directed toward detecting undesirable post channel modulation by monitoring the signal strength/amplitude and/or noise to detect these patterns.

The experimental results suggest that improvements in signal to noise ratio are easily obtainable for between 3 and 19 dB. These experimental results, however, are not meant to be limiting as further improvements are expected depending upon the particular situation and upon refinements to the transmission protocols. For instance, various embodiments are directed toward extending the symbol time to help mitigate the effects of undesirable post channel modulation. This can be used alone or in combination with selection of sub-channel spacing. Still other embodiments are directed toward the selection of a different modulation scheme, which is not as susceptible to amplitude modulations from undesirable post channel modulation.

The system can also be configured to allow for further refinement and adjustment in response to additional experimental results. For instances, additional types of undesirable post channel modulation may exhibit different signal and noise patterns. Experimental results have also shown a correlation between load changes at a customer premises and the undesirable post channel modulation. For instance, a home furnace or air conditioning unit remains largely powered down between activations. When activated, these types of devices can draw a significant amount of energy and thereby change the load at the home.

Aspects of the present disclosure recognize that the system can use this information to assist in detecting the presence of the undesirable post channel modulation. Thus, while certain embodiments allow for a human operator to view system characteristics to detect undesirable post channel modulation, this detection can also be automated. For instance, endpoint devices may include or be connected to, load control units (LCUs) that can be used to provide dynamic control over power provided to the connected load. For instance, an LCU can be configured to detect a drop in voltage and to interrupt power to the connected load in response to the detected drop. In some instances, the LCU might be connected to a load that is also responsible for the undesirable post channel modulation. Accordingly, the LCU can have information useful for characterizing and detecting the undesirable post channel modulation. This can include, for example, detecting a time period when the LCU-connected device is activated and attempting to correlate this time period with other data indicative of undesirable post channel modulation. This information can be displayed to a human operator or provided to a processing circuit. In either instance, the sub-channel spacing can be selected for any endpoint for which undesirable post channel modulation has been detected.

In particular examples, input regarding changes to a load can be used to train the system to detect the particular characteristics of the post modulation for a particular endpoint and its current installation. For instance, data regarding the noise level response to events, such as a load being enabled and disabled (as indicated by an LCU), could be collected. Relevant features of the noise level could then be identified by a comparison of the noise levels for different events. Subsequent post modulation could then be detected by identifying such relevant features. This can be particularly useful for situations where there are additional sources of significant load changes. For instance, an LCU may be placed on an air conditioning unit, but another appliance might also draw significant power and cause a similar change in load.

Once potential times that undesirable post modulation may have occurred have been identified, data can be analyzed to assess whether or not undesirable post modulation actually occurred in a significant manner. For instance, a particular endpoint may have poor signal quality (e.g., measured by a poor bit error rate). The system can check for a correlation between the poor signal quality and the potential times to ascertain whether or not the poor signal quality is caused by undesirable post modulation or by some other problem. The system can then respond accordingly, e.g., by increasing/selecting a sub-channel spacing when there is sufficient correlation and by increasing transmitter gain when there is not sufficient correlation. Other mechanisms for detecting undesirable post modulation can also be used, either in isolation or in combination.

Aspects of the present disclosure recognize the existence of potential boundary conditions for channel allocation. When channels are allocated back-to-back, they can be allocated such that the upper sub-channels of one channel are not directly adjacent to the low tone of the immediately above channel. In one instance, the collector can be configured to check the channel assignments for channels on either side of a channel assigned to an endpoint, when the channel has been set with wider sub-channel spacing. The collector can then, as necessary, adjust the sub-channel spacing for corresponding endpoint(s). For instance, one or more of the lowest or highest sub-channels could be left unused in the nearest channels.

The signals and associated logic and functionality described in connection with the figures can be implemented in a number of different manners. Unless otherwise indicated, various general-purpose systems and/or logic circuitry may be used with programs in accordance with the teachings herein, or it may prove convenient to use a more specialized apparatus to perform the disclosed aspects. For example, according to the present disclosure, one or more of the methods can be implemented in hard-wired circuitry by programming a general-purpose processor, other fully or semi-programmable logic circuitry, and/or by a combination of such hardware and a general-purpose processor configured with software. Accordingly, the various components and processes shown in the figures can be implemented in a variety of circuit-based forms, such as through the use of data processing circuit modules.

It is recognized that aspects of the disclosure can be practiced with computer/processor-based system configurations other than those expressly described herein. The required structure for a variety of these systems and circuits would be apparent from the intended application and the above description.

The various terms and techniques are used by those knowledgeable in the art to describe aspects relating to one or more of communications, protocols, applications, implementations, and mechanisms. One such technique is the description of an implementation of a technique expressed in terms of an algorithm or mathematical expression. While such techniques may be implemented, for example, by executing code on a computer, the expression of that technique may be conveyed and communicated as a formula, algorithm, or mathematical expression.

For example, a block or module denoting "C=A+B" as an additive function implemented in hardware and/or software would take two inputs (A and B) and produce a summation output (C), such as in combinatorial logic circuitry. Thus, the use of formula, algorithm, or mathematical expression as descriptions is to be understood as having a physical embodiment in at least hardware (such as a processor in which the techniques of the present disclosure may be practiced as well as implemented as an embodiment).

In certain embodiments, machine-executable instructions are stored for execution in a manner consistent with one or more of the methods of the present disclosure. The instructions can be used to cause a general-purpose or special-purpose processor that is programmed with the instructions to perform the steps of the methods. The steps may be performed by specific hardware components that contain hardwired logic for performing the steps, or by any combination of programmed computer components and custom hardware components.

In some embodiments, aspects of the present disclosure may be provided as a computer program product, which may include a machine or computer-readable medium having stored thereon instructions, which may be used to program a computer (or other electronic devices) to perform a process according to the present disclosure. Accordingly, the computer-readable medium includes any type of media/machine-readable medium suitable for storing electronic instructions.

Various modules may be implemented to carry out one or more of the operations and activities described herein and/or shown in the figures. In these contexts, a "module" is a circuit that carries out one or more of these or related operations/activities. For example, in certain of the above-discussed embodiments, one or more modules are discrete logic circuits or programmable logic circuits configured and arranged for implementing these operations/activities, as in the circuit modules shown in the figures. In certain embodiments, the programmable circuit is one (or more) computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

The various embodiments described above are provided by way of illustration and should not be construed to necessarily limit the invention. Based on the above discussion and illustrations, those skilled in the art will readily recognize that various modifications and changes may be made to the present invention without strictly following the exemplary embodiments and applications illustrated and described herein. For instance, such changes may include the use of different, or additional, load-responsive parameters. Such modifications and changes do not depart from the true spirit and scope of the present invention, including aspects set forth in the following claims.

What is claimed is:

1. A method for communicating data from a plurality of endpoint devices to a collector device over a power distribution line, the method comprising:

detecting an undesirable post modulation of a communication from one of the plurality of endpoint devices and a related loss of orthogonality between multiple orthogonal frequency sub-channels for a communication from an endpoint device of the plurality of endpoint devices, wherein the undesirable post modulation includes inter-channel interference between sub-channels, the communication from the endpoint device of the plurality of endpoint devices is encoded using frequency shift keying (FSK) and the loss of orthogonality is a result of amplitude modulation caused by undesirable post modulation; and in response to detecting occurrences of the undesirable post modulation of the communication from the one of the plurality of endpoint devices to the collector device over the power distribution line correlating with occurrences of a bit error rate exceeding a threshold error rate, selecting for the endpoint device of the plurality of endpoint devices, a spacing between the multiple orthogonal frequency sub-channels for future communication, wherein selecting the spacing includes selecting a subset of the sub-channels that will not be used.

2. The method of claim 1, wherein the step of detecting includes measuring noise or detecting corrupt data in communications from the endpoint device, further including detecting that the occurrences of the undesirable post modulation correlate with occurrences of a bit error rate exceeding a threshold error rate.

3. The method of claim 1, wherein the communication from the endpoint device of the plurality of endpoint devices is encoded using multi-tone frequency shift keying (MTFSK).

4. The method of claim 1, further comprising increasing transmitter gain in response to times of the occurrences of undesirable post modulation not correlating with times of occurrences of the bit error rate exceeding the threshold error; and wherein the subset are located, in frequency, between each sub-channel that is used.

5. A method comprising:

communicating data from a plurality of endpoint devices to a collector device over a power distribution line, the communication of data from each of the plurality of endpoint devices being carried out by modulating data using multiple orthogonal frequency sub-channels and being encoded using frequency shift keying (FSK);

detecting undesirable post modulation of a communication from one of the plurality of endpoint devices and a related loss of orthogonality, wherein the undesirable post modulation includes inter-channel interference between sub-channels and the loss of orthogonality is a result of amplitude modulation caused by undesirable post modulation; and in response to detecting occurrences of the undesirable post modulation correlating with occurrences of a bit error rate exceeding a threshold error rate, selecting for the one of the plurality of endpoint devices, a spacing between the multiple orthogonal frequency sub-channels for future communication.

6. The method of claim 5, wherein the step of detecting the undesirable post modulation includes detecting a related loss of orthogonality, and wherein the step of selecting the spacing includes identifying sub-channels from the multiple orthogonal frequency sub-channels that are not to be used for transmission of modulated data.

7. The method of claim 5, wherein the step of detecting post modulation includes detecting increases to a signal noise floor for the one of the plurality of endpoint devices.

8. The method of claim 5, wherein the step of detecting post modulation includes measuring a signal noise floor for the one of the plurality of endpoint devices during transmission of a given symbol from one of the plurality of endpoint devices.

9. The method of claim 5, wherein the step of detecting post modulation includes detecting corrupt data from the one of the plurality of endpoint devices.

10. The method of claim 5, wherein the step of detecting post modulation includes detecting a specific pattern of signal noise floor changes that is correlated to post modulation of the communication from the one of the plurality of endpoint devices.

11. The method of claim 10, wherein the specific pattern includes detecting two noise floor changes that correspond to an increase and a decrease in signal strength, respectively.

12. The method of claim 5, wherein the step of detecting post modulation includes detecting a reoccurrence of a specific pattern of signal strength that includes a step pattern of reduced signal strength for the one of the plurality of endpoint devices.

13. The method of claim 5, wherein the step of detecting post modulation includes detecting a change in impedance on the power distribution line and for a transmitter circuit of the one of the plurality of endpoint devices.

14. A system for communicating data over power utility lines, the system comprising:

a plurality of endpoint devices, each endpoint device including:

a modulation circuit configured and arranged to modulate data using multiple orthogonal frequency sub-channels, to encode the data for communication using frequency shift keying (FSK), and to modify a spacing between the multiple orthogonal frequency sub-channels in response to data received at an input; and a power line interface circuit configured and arranged to transmit the modulated data over a power utility line; and a detection module configured and arranged to detect post modulation and a related loss of orthogonality between multiple orthogonal frequency sub-channels in a communication from one of the plurality of endpoint devices and to provide a signal responsive to detected post modulation to the input, wherein the post modulation includes inter-channel interference between sub-channels and the loss of orthogonality is a result of amplitude modulation caused by undesirable post modulation; and wherein the modulation circuit is further configured and arranged to modify the spacing between the multiple orthogonal frequency sub-channels in response to occurrences of the detected post modulation correlating with occurrences of a bit error rate exceeding a threshold error rate.

15. The system of claim 14, further including a collector device that includes the detection module and that is configured and arranged to communicate with the plurality of endpoint devices.

16. The system of claim 14, wherein the modulation circuit is further configured and arranged to use multi-tone frequency shift keying (MTFSK).

17. The system of claim 14, wherein the detection module is configured and arranged to detect post modulation by detecting increases to a signal noise floor for one of the plurality of endpoint devices.

18. The system of claim 14, wherein the modulation circuit is configured and arranged to modify the spacing between the multiple orthogonal frequency sub-channels by deactivating a plurality of the multiple orthogonal frequency sub-channels to increase the spacing between active orthogonal frequency sub-channels of the multiple orthogonal frequency sub-channels.

19. The system of claim 14, wherein the detection module is configured and arranged to detect changes in a signal noise floor for one of the plurality of endpoint devices that correspond to impedance changes at the one of the plurality of endpoint devices and to provide the signal in response to the detection of changes in the signal noise floor.

20. An apparatus comprising:

communication circuitry configured and arranged to communicate data from a plurality of endpoint devices to a collector device over a power distribution line, the communicated data from the plurality of endpoint devices to the collector device being encoded using frequency shift keying (FSK);

detection circuitry configured and arranged to detect an undesirable post modulation of a communication from one of the plurality of endpoint devices and a related loss of orthogonality between multiple orthogonal frequency sub-channels for a communication from an endpoint device of the plurality of endpoint devices, wherein the undesirable post modulation includes inter-channel interference between sub-channels and the loss of orthogonality is a result of amplitude modulation caused by undesirable post modulation; and signal-processing circuitry configured and arranged to select, for the endpoint device of the plurality of endpoint devices, a spacing between the multiple orthogonal frequency sub-channels for ongoing communication in response to detected occurrences of the undesirable post modulation correlating with occurrences of a bit error rate exceeding a threshold error rate.

* * * * *